(12) United States Patent
Villeneuve et al.

(10) Patent No.: US 10,328,649 B2
(45) Date of Patent: Jun. 25, 2019

(54) DIE HAVING TEXTURED INSERTS FOR MANUFACTURING A TEXTURED MOULD FOR MOULDING AND VULCANIZING TIRES

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Bernard Villeneuve, Clermont-Ferrand (FR); Anne-Laure Fraenkel, Clermont-Ferrand (FR); Hélène Emorine, Clermont-Ferrand (FR); Jonathan Lejeune, Clermont-Ferrand (FR)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 123 days.

(21) Appl. No.: 15/329,733

(22) PCT Filed: Jul. 21, 2015

(86) PCT No.: PCT/IB2015/001209
§ 371 (c)(1),
(2) Date: Jan. 27, 2017

(87) PCT Pub. No.: WO2016/016698
PCT Pub. Date: Feb. 4, 2016

(65) Prior Publication Data
US 2017/0217113 A1      Aug. 3, 2017

(30) Foreign Application Priority Data

Jul. 30, 2014   (FR) .................................. 14 01754

(51) Int. Cl.
*B29D 30/06*      (2006.01)
*B29C 33/38*      (2006.01)
(Continued)

(52) U.S. Cl.
CPC ...... *B29D 30/0606* (2013.01); *B29C 33/3878* (2013.01); *B22C 7/00* (2013.01);
(Continued)

(58) Field of Classification Search
CPC ........... B29C 33/3842; B29C 33/3857; B29C 33/3878; B29C 33/3892; B29C 33/424;
(Continued)

(56) References Cited

U.S. PATENT DOCUMENTS 2,263,001 A     11/1941  Gunsaulus et al.
2,983,699 A  *   5/1961  Reid ................... B29C 33/3857
                                                  260/998.18
(Continued)

FOREIGN PATENT DOCUMENTS

EP        0 858 915        8/1998
EP        1 393 849        3/2004
(Continued)

*Primary Examiner* — James P Mackey
(74) *Attorney, Agent, or Firm* — Cozen O'Connor

(57) ABSTRACT

Die (1) representing a tread pattern model for a tread of a tire to be molded, said die being made up of a die body (2) and at least one insert (10) attached to the body of said die, covering at least one of the surfaces of the grooves (4) in the body (2), the insert having at least one substantially flat surface provided with textures.

14 Claims, 4 Drawing Sheets

(51) Int. Cl.
  *B29C 33/42* (2006.01)
  *B22C 7/00* (2006.01)
  *B29L 30/00* (2006.01)

(52) U.S. Cl.
  CPC ........ *B29C 33/3892* (2013.01); *B29C 33/424* (2013.01); *B29D 2030/0612* (2013.01); *B29D 2030/0616* (2013.01); *B29K 2905/02* (2013.01); *B29L 2030/002* (2013.01)

(58) Field of Classification Search
  CPC .. B22C 7/00; B22C 9/06; B22C 13/00; B29D 30/0606; B29D 2030/0612; B29D 2030/0616
  See application file for complete search history.

(56) References Cited

U.S. PATENT DOCUMENTS

| | | | |
|---|---|---|---|
| 6,112,788 A * | 9/2000 | Ikeda | B60C 11/0309 |
| | | | 152/209.19 |
| 6,505,661 B1 | 1/2003 | Nakagawa et al. | |
| 6,551,086 B1 | 4/2003 | Tuttle | |
| 7,402,031 B2 * | 7/2008 | Hyakutake | B22C 9/02 |
| | | | 425/28.1 |
| 9,238,309 B2 * | 1/2016 | King | B29C 33/3857 |
| 9,346,229 B2 * | 5/2016 | Cocural | B29D 30/0606 |
| 2002/0176792 A1 * | 11/2002 | Tuttle | B22F 3/1283 |
| | | | 419/8 |
| 2003/0111150 A1 * | 6/2003 | Zimmer | B60C 11/00 |
| | | | 152/209.19 |

FOREIGN PATENT DOCUMENTS

| | | |
|---|---|---|
| JP | 2001 150444 | 6/2001 |
| WO | WO 95/18022 | 7/1995 |
| WO | WO 2010/072961 | 7/2010 |
| WO | WO 2010/096072 | 8/2010 |

\* cited by examiner

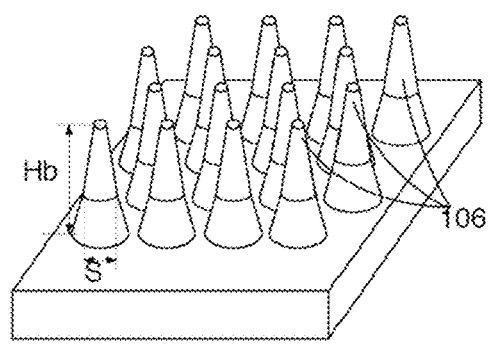
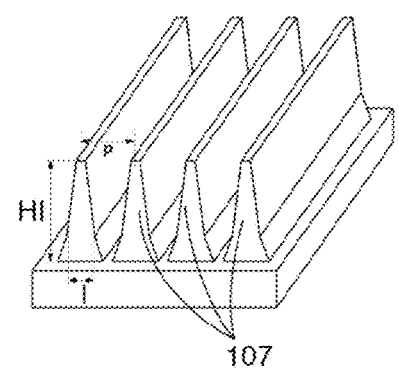
Figure 6  Figure 7
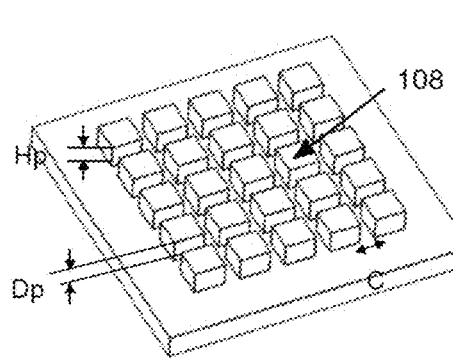
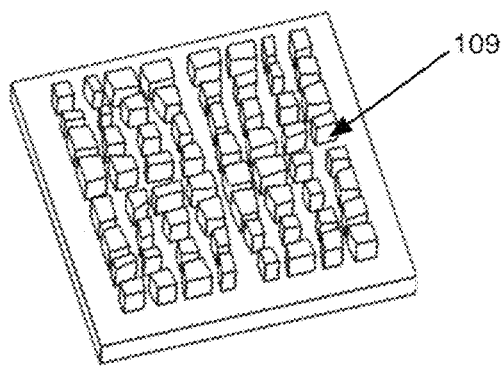
Figure 8  Figure 9
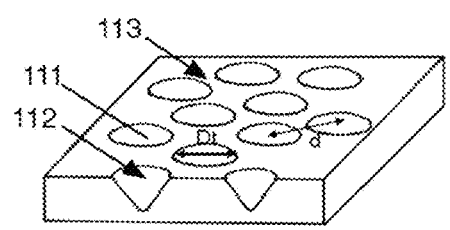
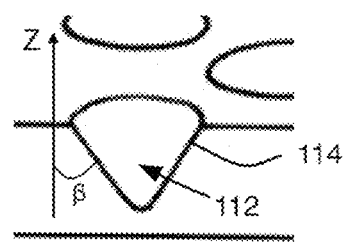
Figure 10  Figure 11

DIE HAVING TEXTURED INSERTS FOR MANUFACTURING A TEXTURED MOULD FOR MOULDING AND VULCANIZING TIRES

RELATED APPLICATIONS

This is a U.S. National Phase Application under 35 USC 371 of International Application PCT/IB2015/001209 filed on Jul. 21, 2015.

This application claims the priority of French application no. 1401754 filed Jul. 30, 2014, the entire content of which is hereby incorporated by reference.

FIELD OF THE INVENTION

The present invention relates to a die representing a tread pattern model for a tread of a tire to be moulded. It also provides a method for manufacturing a mould for moulding and vulcanizing tires.

BACKGROUND OF THE INVENTION

The document WO2010072961 describes a die for manufacturing a tire mould, said die being produced by laser sintering. By virtue of this manufacturing method, the part to be manufactured can be modelled by computer and manufactured easily on the basis of this modelling. However, the document describes a one-piece element, the design and manufacture of which have to be revised as soon as an architectural or dimensional change is made to the final product to be moulded. Moreover, the large parts manufactured by this method are relatively expensive to produce, mainly because the base materials are specific to the manufacturing method.

The application WO2010096072 relates to a cast moulding method, useful in the context of manufacturing micro-textured objects. The introduction of a plurality of micro-patterns into the surface of an object makes it possible to add certain features to the micro-textured object, for instance an increase in hydrophobicity. Some of the casting and moulding methods described in that document make it possible to arrive at the manufacture of objects that have both macro- and micro-features, for instance micro-patterns inside or on zones having macro-features. The method described therein is used exclusively on curved surfaces.

The document U.S. Pat. No. 2,263,001 describes a method for moulding tires by vulcanization. The method uses a support having a plaster core to which a plurality of thin plates are fastened. Some of the plates are embedded in the plaster, and others protrude from the plaster. The core is placed in a mould and molten metal is poured into the mould around the thin plates outside the core. In this way, the outer parts are anchored in the moulded casting so as to make it possible to mould slits in the tread.

There is thus a need for a solution that makes it possible to produce dies at a lower cost, making it possible to take into account both the changes to the end product and the increasingly stringent requirements relating to the characteristics of shapes, dimensions and precision of the various zones of the dies.

The invention provides various technical means for remedying these various drawbacks.

SUMMARY OF THE INVENTION

First of all, a first object of the invention is to provide a die representing a tread pattern model for a tread of a tire having elements with highly complex textures and/or very small dimensions with very high precision and at an attractive cost.

Another object of the invention is to provide a method for manufacturing moulds for moulding and vulcanizing tires, making it possible to obtain several moulds that each exhibit a high level of quality, at an advantageous cost.

To this end, one aspect of the invention relates to a die representing a tread pattern model for a tread of a tire to be moulded, said die being made up of a die body provided with grooves and at least one insert attached to the body of said die, said insert covering at least one of the surfaces of the grooves in the body, the insert having at least one substantially flat surface provided with textures.

With such an architecture, it is possible to produce a die that bears very high precision textured surfaces, even if the textured surfaces are difficult to access. Moreover, a single die makes it possible to manufacture several moulds, making the concept particularly advantageous.

In one variant embodiment, the insert also covers at least one of the surfaces of the tops of tread patterns on the body.

According to another advantageous embodiment, the die comprises at least two adjacent inserts covering two surfaces that form generally separate planes.

Advantageously, the separate planes are disposed in an "L" shape in the die.

Also advantageously, the die comprises three adjacent inserts covering three surfaces that form generally separate planes.

According to yet another embodiment, the separate planes are disposed in a "U" shape in the die.

According to another variant embodiment, at least two inserts placed in the die are provided with different textures.

According to yet another embodiment, the textures comprise a plurality of recessed or protruding elements formed integrally with the die.

According to another advantageous embodiment, all or some of the textures are formed by cones distributed through the texture at a density at least equal to one cone per square millimeter ($mm^2$), each cone having a mean cross section of between $0.0005\ mm^2$ and $1\ mm^2$.

According to yet another embodiment, all or some of the textures are substantially mutually parallel striations, the spacing of the striations in the pattern being at most equal to 0.5 mm, each striation having a mean width of between 0.02 mm and 0.5 mm.

According to another advantageous embodiment, all or some of the textures form parallelepipeds having a side length of between 0.05 mm and 0.5 mm and a height of between 0.05 mm and 0.5 mm, the distance between two adjacent parallelepipeds in the texture being between 0.05 mm and 0.5 mm.

According to another advantageous embodiment, the protruding elements form strands, said strands being distributed through the pattern at a density at least equal to one strand per square millimeter ($mm^2$), each strand having a mean cross section S of between $0.0005\ mm^2$ and $1\ mm^2$.

According to yet another advantageous embodiment, the protruding elements form mutually parallel blades, the spacing of the blades in the pattern being at most equal to 0.5 mm, each blade having a mean width of between 0.02 mm and 0.5 mm.

According to yet another embodiment, the recessed or protruding elements exhibit mutually variable shapes and distances.

Another aspect of the invention provides a method for manufacturing a mould for moulding and vulcanizing tires, comprising the steps of:

manufacturing a die as described above having at least one groove formed by substantially flat surfaces;

disposing in each of the grooves at least one insert made up of corresponding substantially flat surfaces provided with textures;

manufacturing, from the die provided with the inserts, a mould made of flexible material corresponding to the negative form of the tire to be moulded, made of flexible material, preferably silastene;

manufacturing, from the flexible mould, a die made of brittle material, preferably plaster, corresponding to the profile of the tire to be moulded;

manufacturing, from the brittle material die, a mould corresponding to the negative form of the tire to be moulded, made of metal material, preferably aluminium;

removing the brittle material die, for example by destroying the latter, so as to release the metal mould obtained.

Advantageously, the textures of the inserts are manufactured by 3D printing or laser machining, or with the aid of punches, or by selective fusion of metal powder, or by electrical discharge machining.

BRIEF DESCRIPTION OF THE DRAWINGS

FIG. 2b shows a profile view of the die from FIG. 2a;

FIG. 5b is an enlarged view of a textured zone of the arrangement in FIG. 5a;

FIGS. 6 to 11 illustrate various examples of types of texture that are able to be arranged on an insert according to an embodiment of the invention;

DETAILED DESCRIPTION OF THE DRAWINGS

Figure 1:
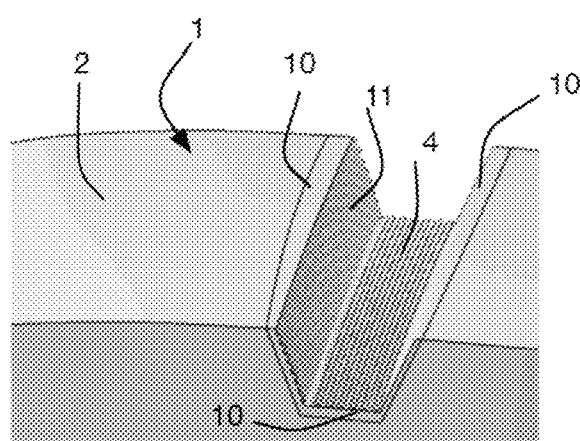
FIG. 1 is a perspective view of a portion of a die according to an embodiment of the invention.
Figure 2A:
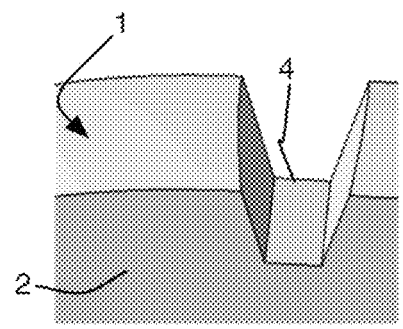
FIG. 2a shows a perspective view of a portion of a die made up of a die body and a groove surface, before incorporation of the inserts.
Figure 2B:
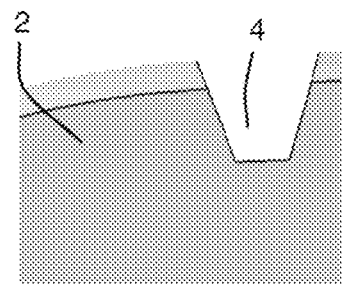

FIG. 1 shows a perspective view of a portion of a die 1 according to the invention that is provided with a body 2 and with grooves 4, the surface of which is covered with three inserts 10 arranged in a "U" shape, these inserts being provided with textures 11. FIGS. 2a and 2b show a similar zone of the body 2 before the inserts are fitted in the grooves 4. It can be seen that the inserts are advantageously provided on tread pattern elements that delimit the grooves. The inserts are furthermore provided with very high precision textures, even if the patterns are complex and/or have relatively small dimensions. Moreover, since the textures are produced on separate elements (the inserts), it is possible to provide manufacturing conditions that are specifically tailored such that the levels of quality and precision are ensured consistently on all of the surfaces, at a particularly attractive cost. Finally, the concept makes it possible to produce, from a single die body, architectural variants in which the arrangements of textures can vary in order to create a considerable number of variants at low cost. These arrangements can provide textures of which the shapes and/or dimensions and/or distributions can vary, depending on requirements.

Figure 3:
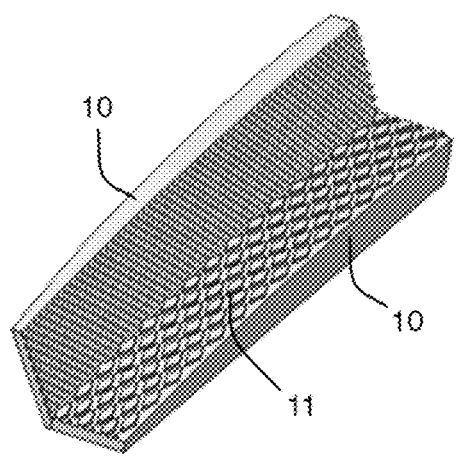
FIGS. 3 and 4 illustrate examples of arrangements of inserts for dies.
Figure 4:
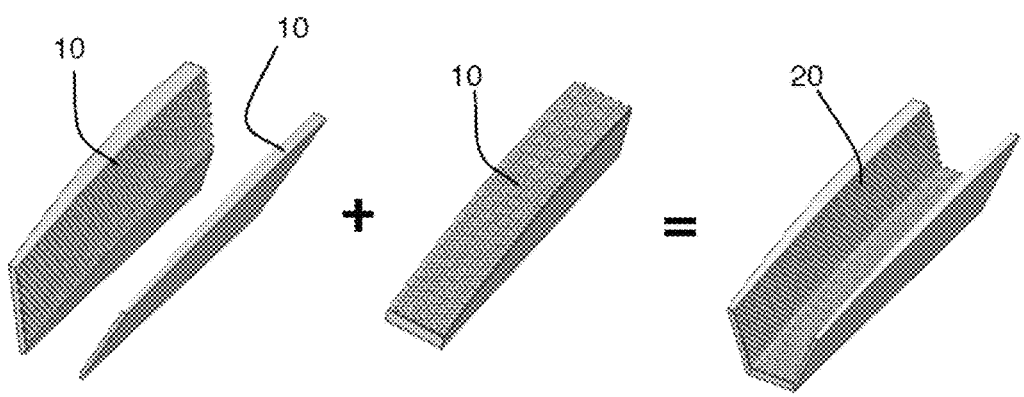

FIGS. 3 and 4 illustrate examples of arrangements of inserts 10 provided with textures 11. In the example in FIG. 3, the two inserts 10 are adjacent and assembled in an "L" shape. The two inserts are advantageously provided with different textures 11.

FIG. 4 illustrates the assembly of three adjacent inserts 10 so as to cover three groove surfaces and thus form a "U". The inserts are provided with textures 11. The resulting arrangement of inserts 20 is shown in more detail in FIGS. 5a and 5b.

In all these exemplary embodiments, provision is advantageously made for the adjacent inserts to be connected together prior to being joined to the body of the die, so as to render final assembly easier and to reduce the number of manipulations to be carried out on the die.

Figure 5A:
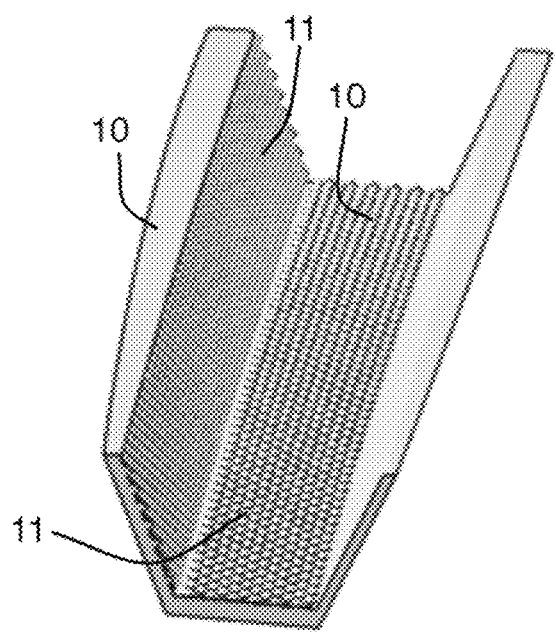
FIG. 5a is a perspective view of an arrangement of inserts in a "U" shape.
Figure 5B:
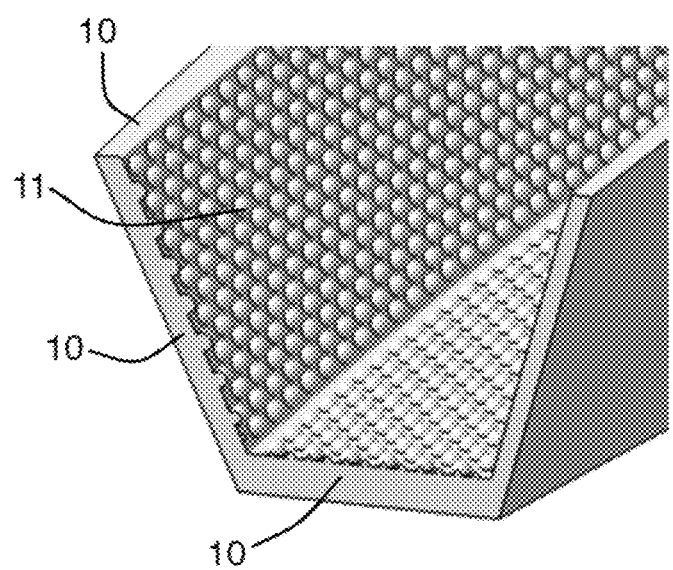

FIG. 5a shows a perspective view of an arrangement of three inserts in a "U" shape. The inserts are provided with textures 11. FIG. 5b shows an enlarged perspective view of the arrangement in FIG. 5a where the textures 11 are clearly visible. In this example, the textures are made up of small circular surfaces that extend towards the grooves from the walls.

FIGS. 6 to 11 illustrate further examples of textures that can be disposed on one of the inserts according to the invention.

FIG. 6 illustrates an embodiment in which the pattern has a plurality of strands 106. The strands 106 are distributed in the pattern at a density at least equal to one strand per $mm^2$, each strand having a mean cross section S of between 0.0005 $mm^2$ and 1 $mm^2$. It will be noted that the mean cross section of each strand corresponds to the mean of the cross sections S measured at regular intervals from the base of the strand. The strands 106 have a conical overall shape with a cross section that decreases over the height Hb of these strands.

FIG. 7 illustrates an embodiment in which the pattern has a plurality of mutually parallel blades 107, the spacing of the blades 107 in the pattern being at most equal to 0.5 mm, each blade 107 having a mean width of between 0.02 mm and 0.5 mm. It will be noted that the mean width corresponds to the mean of the widths I measured at regular intervals over the height HI of the blade, the height of each blade being between 0.05 and 0.5 mm.

In another variant embodiment, the pattern has a combination of strands 106 and/or blades 107.

The invention is not limited to the examples described and shown and various modifications can be made thereto without departing from its scope. Thus, according to another non-limiting variant embodiment, the blades 107 from FIG. 7 can be discontinuous. They have a flat part between one another. They can also have cross-sectional differences between one another. In addition, the blades can have curves or angles, notably along their length. They can also have a variable length.

In the example in FIG. 8, the patterns have a parallelepipedal cross section 108 having a side length C of between 0.05 mm and 0.5 mm and a height Hp of between 0.05 mm and 0.5 mm, the distance Dp between two adjacent cavities in the texture being between 0.05 mm and 0.5 mm. In a variant, the cross section of the patterns can be circular or polygonal (for example hexagonal). With the square or polygonal structures, it is possible to more easily organize the elements with respect to one another so as to limit the surface area of the intermediate zones between the elements.

In the variant in FIG. 9, the elements 109 have mutually variable shapes and distances. This variant makes it possible to render the details of the texture less visible.

FIG. 10 illustrates the pattern according to another non-limiting variant embodiment. In this variant, the pattern is formed by a plurality of cavities 112. The cavities 112 are in this case in the form of cones which extend into the depth of the mould and open out of the mould, forming circular openings 111. The cavities 112 thus have a cross section which decreases with depth into the mould. It will be noted that, in this variant, the openings 111 of the cavities 112 are not in contact. The openings 111 are separated by intermediate zones 113. Moreover, the openings 111 are distributed regularly over the mould such that the distance d between each opening of the pattern is similar overall.

FIG. 11 is an enlarged view of the pattern in FIG. 10. In this case, all or some of the cavities have at least one wall 114 which, in cross section, forms an angle β of between 10° and 60° with respect to a direction Z perpendicular to the pattern.

Figures 13A, 13B:
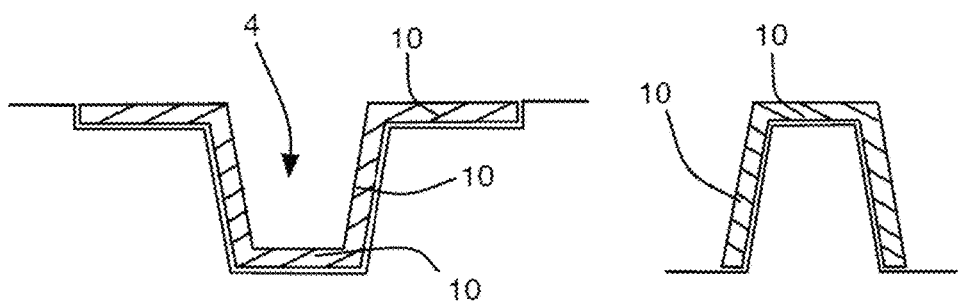
FIG. 13a illustrates a variant embodiment in which inserts extend beyond the surface of a groove in order to cover at least a portion of the top of a tread pattern element.
FIG. 13b illustrates another variant embodiment in which inserts surround a tread pattern element at the walls and on the top.

FIGS. 13a and 13b are enlarged cross-sectional views illustrating variant embodiments of a die according to the invention in which inserts 10 are arranged in a specific manner with respect to grooves. In the example in FIG. 13a, the inserts 10 extend beyond the surface of a groove 4 in order to cover at least a portion of the top of a tread pattern element delimiting the groove. In the example in FIG. 13b, inserts 10 surround a tread pattern element at the walls and on the top. In a variant that is not illustrated, the inserts of the walls only cover the upper portion of the walls.

The die 1 according to the invention, the inserts and in particular the shaping of the textures 11 can be realized by 3D printing or laser machining, with the aid of punches or by electrical discharge machining. Such a die has the advantage of making it possible to manufacture a plurality of moulds for moulding and vulcanizing tires. By virtue of the textured die 1 serving as a base model, the manufactured moulds are provided with textures opposite to those of the die, giving the moulded tires textures that match those of the base die, without having to provide a specific subsequent machining step for the mould or for the tires. This results in particularly advantageous ease of manufacture, and lower costs.

However, this die cannot be used directly for industrially manufacturing moulds for moulding and vulcanizing tires. This is because, since the final mould is made of metal material, i.e. non-flexible material, the initial die, which is also not flexible, cannot generally serve to produce the final mould, since the two elements combined would be difficult to separate. Therefore, provision is made, in a known manner, to provide a set of intermediate steps for passing from a rigid die to a flexible intermediate mould, and then to a die that is easy to remove once the final metal mould has been produced. These various steps are illustrated in FIG. 8.

Figure 12:
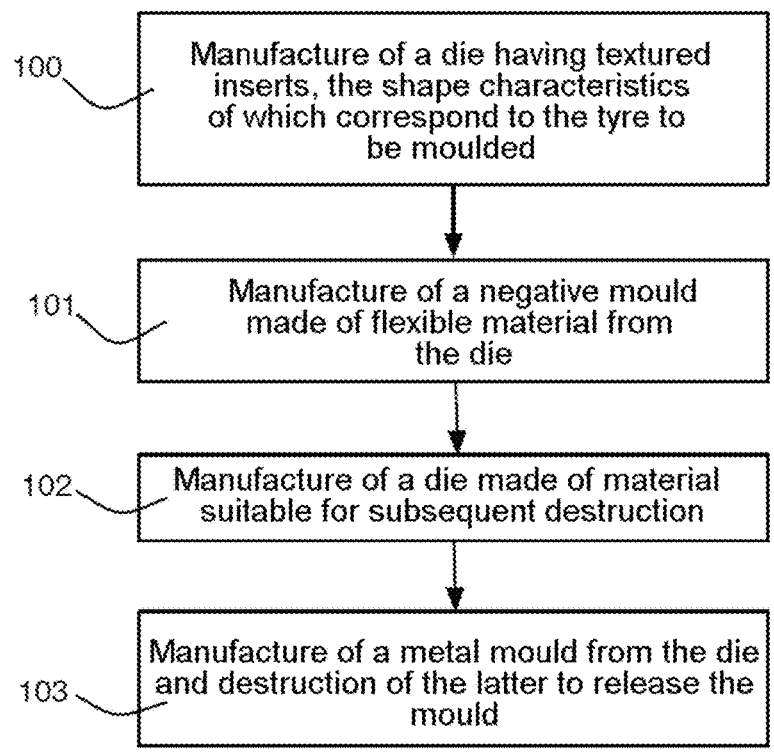
FIG. 12 shows a diagram illustrating the main steps for manufacturing a mould for moulding and vulcanizing a tire from a die according to an embodiment of the invention.

The functional flowchart in FIG. 12 shows the main steps in the method according to the invention for manufacturing a mould for moulding and vulcanizing a tire. In step 100, first of all, a die 1 as described above is manufactured, having textured inserts 10, the shape characteristics of which correspond to the tire to be moulded. The inserts are advantageously manufactured separately, under conditions for shaping the textures, and then attached to the body of the die. Fastening can take place by adhesive bonding, screwing, or the like.

In step 101, a negative mould made of flexible material is produced from this die. On account of the flexibility of the material, the mould obtained can be removed easily from the die 1, which serves both as a support and as a model therefor. In step 102, another die is manufactured, this time from the mould made of flexible material obtained in step 101. Since this die is intended to be sacrificed in a subsequent step, provision is advantageously made to produce the part from inexpensive material that is easy to destroy, for example plaster. It should be noted that this die has a profile corresponding to that of the initial die 1.

Once the plaster die has been obtained, this makes it possible to produce the final metal mould (step 103). The two parts, namely the metal mould and the brittle material die, are separated by breaking the die so as to release the metal mould.

In this way, a metal mould which will make it possible to faithfully reproduce the textures of the base die on the tires to be manufactured is obtained.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A die representing a tread pattern model for a tread of a tire to be moulded, said die comprising:
   a die body provided with one or more grooves, each groove having first, second and third flat surfaces arranged in planes separate from one another; and
   at least one insert assembly, each at least one insert assembly being attached to a groove of the die body and comprising:
   a first insert attached to the first flat surface of the groove in which the at least one insert assembly is attached, wherein the first insert has at least one substantially flat surface provided with first textures,
   a second insert attached to the second flat surface of the groove in which the at least one insert assembly is attached, wherein the second insert is assembled adjacent to the first insert in a first "L" shape and wherein the second insert has at least one substantially flat surface provided with second textures, and
   a third insert attached to the third flat surface of the groove in which the at least one insert assembly is attached, wherein the third insert is assembled adjacent to the second insert in a second "L" shape and wherein the third insert has at least one substantially flat surface provided with third textures.

2. The die according to claim 1, wherein the insert assembly covers at least one of surfaces of tops of tread patterns on the die body.

3. The die according to claim 1, wherein the separate planes are disposed in a U shape.

4. The die according to claim 1, wherein at least two of said first, second and third textures are different from one another.

5. The die according to claim 1, wherein at least one of the first, second and third textures comprises a plurality of recessed or protruding elements formed integrally with said die.

6. The die according to claim 1, wherein all or some of the first, second and third textures are formed by cones distributed through the texture at a density at least equal to one cone per square millimeter ($mm^2$), each cone having a mean cross section of between 0.0005 $mm^2$ and 1 $mm^2$.

7. The die according to claim 1, wherein all or some of the first, second and third textures are substantially mutually parallel striations, the spacing of the striations in the pattern being at most equal to 0.5 mm, each said striation having a mean width of between 0.02 mm and 0.5 mm.

8. The die according to claim 1, wherein all or some of the first, second and third textures form parallelepipeds having a side length of between 0.05 mm and 0.5 mm and a height of between 0.05 mm and 0.5 mm, the distance between two adjacent said parallelepipeds in the texture being between 0.05 mm and 0.5 mm.

9. The die according to claim 5, wherein the protruding elements form strands, said strands being distributed through the pattern at a density at least equal to one strand per square millimeter ($mm^2$), each said strand having a mean cross section of between 0.0005 $mm^2$ and 1 $mm^2$.

10. The die according to claim 5, wherein the protruding elements form mutually parallel blades, the spacing of the blades in the pattern being at most equal to 0.5 mm, each said blade having a mean width of between 0.02 mm and 0.5 mm.

11. The die according to claim 5, wherein the recessed or protruding elements exhibit mutually variable shapes and distances.

12. A method for manufacturing a mould for moulding and vulcanizing tires, comprising the steps of:
   manufacturing the die according to claim 1 having the one or more grooves;
   disposing in each of the grooves the at least one insert assembly comprised of corresponding substantially flat surfaces provided with textures;
   manufacturing, from the die provided with the at least one insert assembly, a mould comprised of flexible material corresponding to the negative form of the tire to be moulded;
   manufacturing, from the flexible mould, a die comprised of brittle material, corresponding to the profile of the tire to be moulded;
   manufacturing, from the brittle material die, a mould corresponding to the negative form of the tire to be moulded, made of metal material; and
   removing the brittle material die so as to release the metal mould obtained.

13. The manufacturing method according to claim 12, wherein the textures of the inserts are manufactured by 3D printing or laser machining, or with the aid of punches, or by selective fusion of metal powder, or by electrical discharge machining.

14. The manufacturing method according to claim 12, wherein said flexible material is made of silastene and said brittle material is made of plaster.

* * * * *